Oct. 11, 1966    E. G. JONES    3,277,519
POLYMER FLAKING APPARATUS
Filed June 2, 1964    2 Sheets-Sheet 1
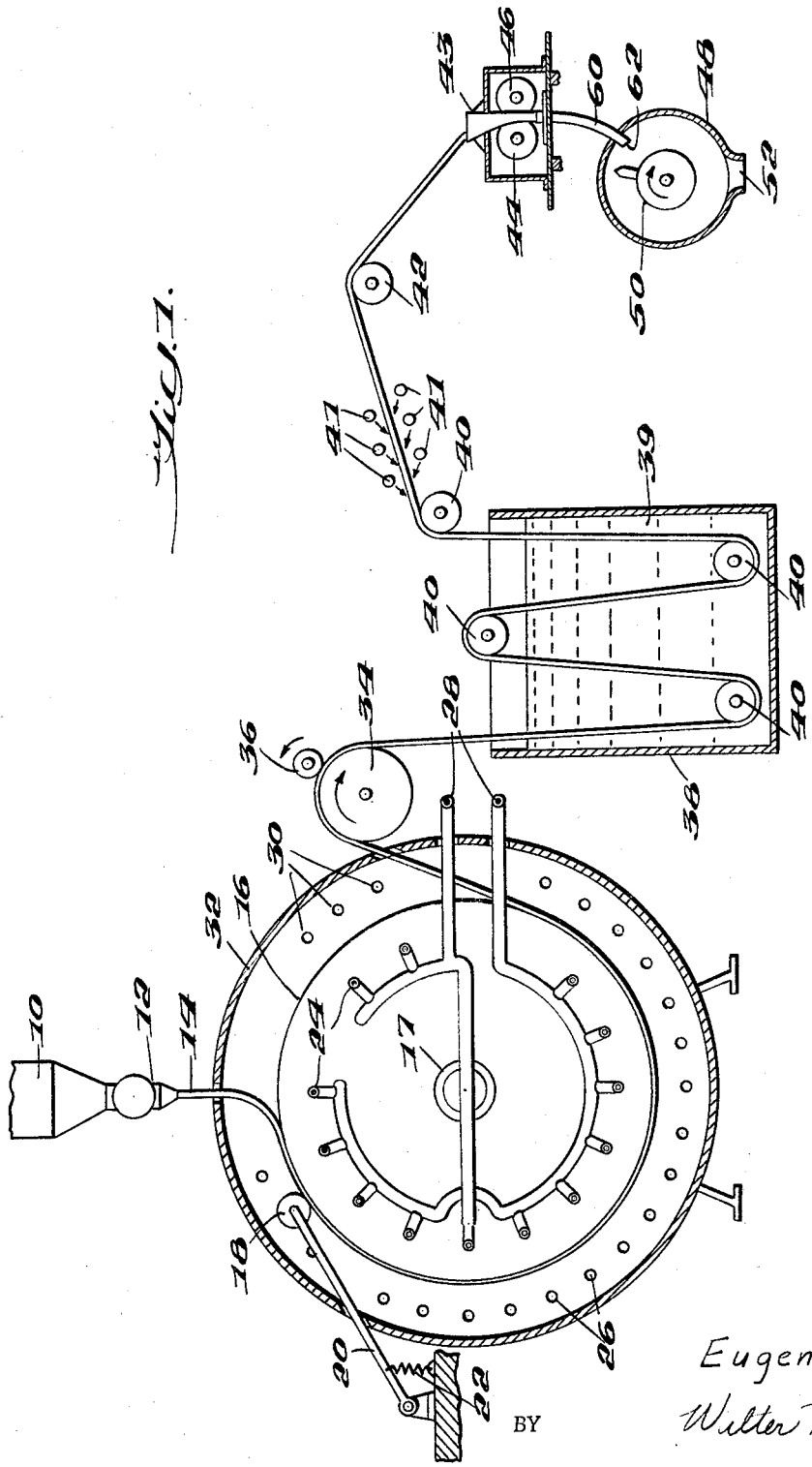
INVENTOR
Eugene G. Jones
BY Walter N. Kirn Jr.
AGENT

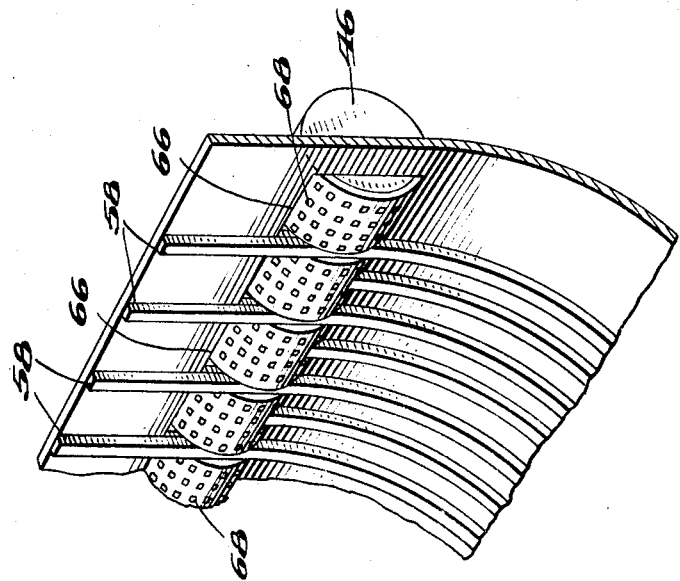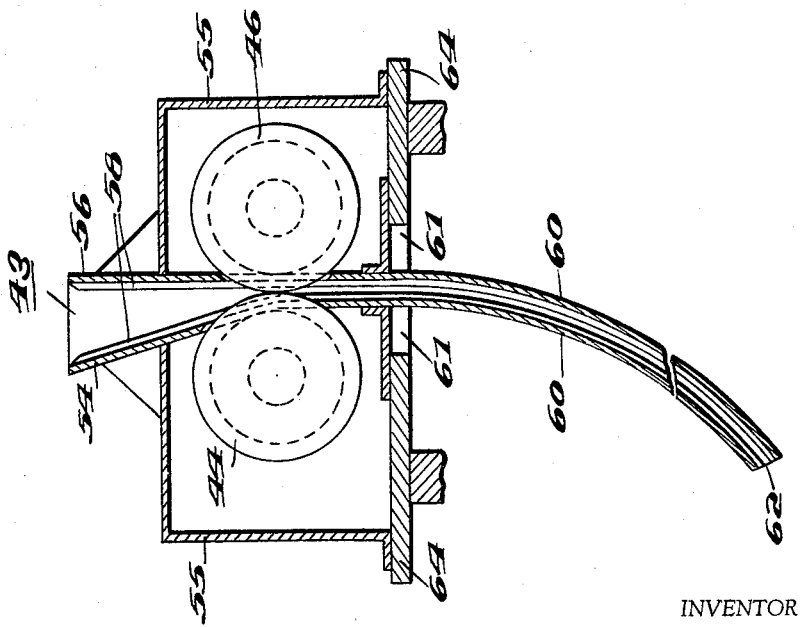

United States Patent Office 3,277,519
Patented Oct. 11, 1966

3,277,519
POLYMER FLAKING APPARATUS
Eugene G. Jones, Martinsville, Va., assignor to E. I. du Pont de Nemours and Company, Wilmington, Del., a corporation of Delaware
Filed June 2, 1964, Ser. No. 371,901
7 Claims. (Cl. 18—1)

This invention relates generally to the production of fiber-forming polymers. More particularly, it relates to an apparatus for converting molten polymeric material into polymer flake or chips.

A process for the production of polymer ribbons generally suitable for conversion into flake has been disclosed by Graves in U.S. Patent No. 2,289,774. One type of apparatus for facilitating rapid quenching has been disclosed by La Forge in U.S. Patent No. 3,071,810. Flake produced by way of these and other known techniques is typically dried, blended and otherwise prepared after which it is fed to the hopper of a melt-spinning apparatus for forming into useable material such as fibers. These techniques are satisfactory for many polymer types. However, some polymers show a greater than normal tendency to remain soft and limp and to have a tacky, high-friction surface. These properties of the latter type of polymers require that the extent of quenching be increased and that positive, low-friction guiding and feeding be arranged, in order to avoid serious difficulties in the production of polymer flake.

It is therefore an object of this invention to provide an improved apparatus for cooling and cutting polymeric material.

Another object is to provide an improved apparatus for cooling and cutting polymeric material which exhibits a greater than normal tendency to remain soft and limp and to have a tacky, high-friction surface.

Other objects and advantages will be apparent from the following description of a particular embodiment of the invention, and the novel features will be particularly pointed out hereinafter in connection with appended claims.

In the accompanying drawing:

FIGURE 1 is a side elevational view partially in section of the apparatus made in accordance with the teaching of the present invention;

FIGURE 2 is a side elevational view partially in section of the cutter feed-guide assembly of this invention; and FIGURE 3 is a perspective view of part of one-half of the cutter feed-guide with the feed-roll assembly of this invention.

In the embodiment of this invention illustrated in FIGURES 1–3, the apparatus includes an autoclave 10 with an extrusion head 12 arranged to direct a polymer ribbon 14 toward the rim 16 of a casting wheel mounted on bearings 17. The casting wheel is driven by conventional means not shown. Circumferentially located on the inside and outside of rim 16 are two groups of nozzles 24 and 26, respectively, arranged to direct a spray of cooling fluid toward ribbon 14 supported on rim 16. A roller 18 is mounted on pivoted arm 20 and biased to pressably engage ribbon 14 supported on rim 16 by means of spring 22.

A group of high velocity water nozzles 30 is located outside the surface of rim 16 and directed toward the ribbon near the position where it is withdrawn from the rim. A pair of stripper-rolls 34 and 36 is located near the surface of rim 16. A shell 32 surrounds rim 16 and is arranged to collect used cooling fluid. Located beyond stripper rolls 34 and 36 is a quenching tank 38 filled with cooling fluid 39 and arranged with tank-rolls 40 above and below the surface of the cooling fluid. Additional air nozzles 41 are located beyond the final tank-roll 40 and arranged to blow on both sides of ribbon 14. An additional guide-roll 42 is located between tank 38 and a cutter feed guide comprising a chute 43 and a pair of feed rolls 44 and 46. The exit end of chute 43 is located inside the housing of a cutter 48 comprising flying knife 50 and an exit port 52 leading to a storage bin for flake not shown.

Pertinent details of chute 43 of the cutter feed-guide are shown in FIGURE 2 to comprise plate-like portions 54, 56 and 60 having spaced ribs 58 extending longitudinally along the inner surface of chute 43. Upper portions 54 and 56 diverge upward to form a feeding entrance. Lower portions 60 are cut at a curved bevel on the bottom end 62 to accommodate the trajectory of the flying knife 50 (FIGURE 1). The upper portions 54 and 56 of the chute 43 are mounted by means of frames 55 on a base 64. Lower portion 60 of chute 43 is mounted by means of angle brackets 61 suitably fastened to base structure 64. As shown more clearly in FIGURE 3, suitable openings 66 are cut in plates 54 and 56 located, e.g., between ribs 58, so arranged to receive knurled portions of rolls 44 and 46. Rolls 44 and 46 are grooved to receive ribs 58. One of the rolls, typically 46, is mounted on fixed bearings not shown arranged to be driven by conventional drive means not shown. Roll 44 then is mounted on slideable bearings and biased toward roll 46 by means such as air cylinders not shown.

In operation, molten polymer in autoclave 10 is forced through extruder 12 by means such as inert gas pressure to form a ribbon 14 which is deposited on the rim 16 of the casting wheel. As the casting wheel turns, the ribbon is transported past spray nozzles 26 and under presser-roll 18 which is designed to score the surface of the ribbon longitudinally. Additional cooling is provided by spray nozzles 24 directed at the inner surface of rim 16. Fluide for the spray nozzles is furnished from supply lines 28. The pair of stripper rolls 34 and 36, with 34 being driven by means not shown, remove the ribbon from the rim 16 and forward it to the quenching tank 38. High velocity water nozzles 30 are located to provide a stream of water at the point where the ribbon is being drawn from the rim 16 in order to minimize the possibility of the ribbon sticking to the rim. After one or more trips through the fluid in tank 38, the ribbon is withdrawn over guide rolls 40 and 42. The ribbon is dried by means of air jets 41 and then introduced into chute 43 of the cutter feed-guide. Ribs 58 of chute 43 provide reduced friction. Exit 60 of chute 43 is curved and dimensioned to provide guidance of the ribbon even though its stiffness is low. The ribbon is thus presented to the cutter for cutting into flake. Rolls 44 and 46 are provided with serration 68 to assist in gripping and forwarding the soft polymer ribbon through the chute 43.

The various elements of the apparatus of this invention can be manufactured from conventional materials suitable for the purposes described above. As previously stated, this apparatus is especially useful in the converting of polymer which has a tendency to remain soft and tacky during the cooling and cutting operations. These polymer characteristics are not limited to any particular composition, however, the apparatus has found particular acceptance in the cooling and cutting of nylon homopolymers and copolymers, particularly where additives are present in the polymer such as antistats, delusterants, antioxidants, and the like.

Prior to the development of this invention, certain polymers could not be efficiently transformed into flake. However, with the provision of the additional quenching and the specially shaped and constructed cutter feed-guide, efficient flake production even for very soft and tacky polymers has been made possible.

It is apparent that many changes and modifications may be made in the disclosed apparatus without departing from the spirit of the present invention which is therefore intended to be limited only by the scope of the appended claims.

What is claimed is:

1. An apparatus for converting molten polymeric material into polymer flake and the like which comprises in combination (1) an extrusion head through which said molten polymeric material is extruded in the form of a ribbon, (2) a casting wheel having a rim on which a length of ribbon is supported as it advances away from said heat, (3) a fluid cooling system arranged about said rim for cooling said length of ribbon, (4) shaped roller means for pressably engaging said supported length of ribbon, (5) supplementary quenching means to further cool said ribbon, (6) drying means for said ribbon after subjection to said supplementary quenching means, (7) a cutter feed-guide comprising a funnel-shaped chute having longitudinal, spaced ribs to provide a path of mineral friction for said ribbon, (8) advancing means for advancing said ribbon through said chute, and (9) cutter means arranged to cut said ribbon into flake as it emerges from said chute.

2. The apparatus of claim 1 wherein said advancing means is at least one pair of feed rolls located intermediate the ends of said chute.

3. An apparatus for converting molten polymeric material into polymer flake and the like which comprises in combination (1) an extrusion head through which said molten polymeric material is extruded in the form of a ribbon, (2) a casting wheel having a rim on which a length of ribbon is supported as it advances away from said head, (3) a fluid cooling system arranged about said rim for cooling said length of ribbon, (4) shaped roller means for pressably engaging said supported length of ribbon, (5) supplementary quenching means to further cool said ribbon, (6) drying means for drying said ribbon after subjection to said supplementary quenching means, (7) a cutter feed-guide comprising a chute having longitudinal, spaced ribs to provide a path of minimal friction for said ribbon, said chute having a relatively enlarged upper portion and an arcuate-shaped, relatively constricted lower portion, (8) advancing means for advancing said ribbon through said chute, and (9) cutter means arranged to cut said ribbon into flake as it emerges from said chute.

4. The apparatus of claim 3 wherein said advancing means is at least one pair of feed rolls located intermediate the ends of said chute.

5. An apparatus for converting molten polymeric material into polymer flake and the like which comprises in combination (1) an extrusion head through which said molten polymeric material is extruded in the form of a ribbon, (2) a casting wheel having a rim on which a length of ribbon is supported as it advances away from said head, (3) a fluid cooling system arranged about said rim for cooling said length of ribbon, (4) shaped roller means for pressably engaging said supported length of ribbon, (5) supplementary quenching means to further cool said ribbon, (6) drying means for drying said ribbon after subjection to said supplementary quenching means, (7) a cutter feed-guide comprising a chute having longitudinal, spaced ribs to provide a path of minimal friction for said ribbon, (8) at least one pair of ribbon feed rolls, one an idler and the other driven, having alternately spaced grooves to receive said longitudinal, spaced ribs and knurled sections fitting through slots in said chute, and (9) cutter means arranged to cut said ribbon into flake as it emerges from said chute.

6. An apparatus for converting molten polymeric material into polymer flake and the like which comprises in combination (1) an extrusion head through which said molten polymeric material is extruded in the form of a ribbon, (2) a casting wheel having a rim on which a length of ribbon is supported as it advances away from said heat, (3) a fluid cooling system arranged about said rim for cooling said length of ribbon, (4) shaped roller means for pressably engaging said supported length of ribbon, (5) supplementary quenching means to further cool said ribbon, (6) drying means for drying said ribbon after subjection to said supplementary quenching means, (7) a cutter feed-guide comprising a funnel-shaped chute having longitudinal, spaced ribs to provide a path of minimal friction for said ribbon, (8) at least one pair of ribbon feed rolls, one an idler and the other driven, having alternately spaced grooves to receive said longitudinal spaced ribs and knurled sections fitting through slots in said chute, (9) and cutter means arranged to cut said ribbon into flake as it emerges from said chute.

7. An apparatus for converting molten polymeric material into polymer flake and the like which comprises in combination (1) an extrusion head through which said molten polymeric material is extruded in the form of a ribbon, (2) a casting wheel having a rim on which a length of ribbon is supported as it advances away from said heat, (3) a fluid cooling system arranged about said rim for cooling said length of ribbon, (4) shaped roller means for pressably engaging said supported length of ribbon, (5) supplementary quenching means to further cool said ribbon, (6) drying means for drying said ribbon after subjection to said supplementary quenching means, (7) a cutter feed-guide comprising a chute having longitudinal, spaced ribs to provide a path of minimal friction for said ribbon, said chute having a relatively enlarged upper portion and an arcuate-shaped, relatively constricted lower portion, (8) at least one pair of ribbon feed rolls, one an idler and the other driven, having alternately spaced grooves to receive said longitudinal, spaced ribs and knurled sections fitting through slots in said chute, and (9) cutter means arranged to cut said ribobn into flake as it emerges from said chute.

References Cited by the Examiner

UNITED STATES PATENTS

| | | |
|---|---|---|
| 2,746,086 | 5/1956 | Vickers. |
| 2,834,053 | 5/1958 | Bilanin et al. _____ 264—141 |
| 2,859,479 | 11/1958 | Eckardt. |
| 2,887,725 | 5/1959 | Vickers et al. |
| 3,071,810 | 1/1963 | La Forge _____ 18—15 |
| 3,076,999 | 2/1963 | Washburn _____ 18—1 |

FOREIGN PATENTS

| | | |
|---|---|---|
| 608,904 | 11/1960 | Canada. |
| 637,759 | 3/1962 | Canada. |
| 1,250,388 | 11/1960 | France. |
| 710,503 | 6/1954 | Great Britain. |

WILLIAM J. STEPHENSON, *Primary Examiner.*